Patented Aug. 24, 1943

2,327,968

UNITED STATES PATENT OFFICE 2,327,968

POROUS XEROGEL

Kurt E. Ripper, Bronxville, N. Y., assignor to American Cyanamid Company, New York, N. Y., a corporation of Maine No Drawing. Application January 28, 1941, Serial No. 376,338

3 Claims. (Cl. 260—72)

This invention relates to the production of porous xerogels and is more particularly concerned with those gels obtained from melamine-formaldehyde condensation products.

The excellent properties of the hardened melamine-formaldehyde condensation products offer interesting possibilities when such products are prepared in the form of dried colloids in the porous adsorbent state. It is desirable that these organic substances be prepared in a form which approaches as nearly as is feasible the properties of silica gel. Such organic condensation products are susceptible of many and varied useful applications.

I have now discovered that I can prepare a melamine-formaldehyde reaction product with the characteristics of an emulsoid or lyophilic sol which can be diluted and gelatinized together with the total amount of the dispersion medium. This sol can be prepolymerized to such a degree of rigidity that the dispersion medium may be removed without substantially altering the original volume occupied by the colloid with its occluded dispersion medium. The resultant non-elastic gel may be subjected to final polymerization and hardening so that there is produced a porous xerogel without the collapse of the structural micelles, the porosity of the gel being due to the formation of interstices occupied previously by the dispersion medium. In the production of these xerogels it is especially necessary to avoid the tendency to form incoherent pulverulent masses which are in the nature of powdery products loosely cemented together and hence are unsuitable for the desired purposes.

More specifically the following examples (in which the parts are given by weight) illustrate specific methods for the production of my xerogels although the invention is not restricted to the details thereof.

EXAMPLE 1

The porous xerogel is prepared in three stages.

a. *Production of the hydrophile sol*

To 243 parts of formalin (37% formaldehyde) was added sufficient sodium hydroxide solution to adjust to pH 8.5 (glass electrode). There was then added to the formaldehyde 76 parts melamine and solution of the latter was obtained by heating the mixture to 65° C. The molar ratio of formaldehyde to melamine was 5:1. The temperature was maintained at 65° C. until the reaction mixture began to show slight signs of turbidity which occurred after about fifteen minutes.

b. *Gelation and prepolymerization*

For each 100 grams of the reaction product (a) there were added 100 cc. of 2 N-sulfuric acid solution. The reaction product, at 65° C., gelled after about two minutes and the gelled mass was maintained at that temperature for an additional thirty minutes.

c. *Drying and final polymerization*

The gelled mass was removed from the container and was dried and polymerized in suitable pans or the like by letting the gel stand at room temperature for about twenty-four hours with subsequent heating at 40°–50° C. for about sixteen hours and then heating at 100° C. for about ten hours. The resultant product was a white porous xerogel, its internal volume being about 20% to 30% of its total volume. The pores are of the magnitude of the wave length of light or higher since the polymerized product itself is transparent and water-clear as can be seen from collapsed particles.

EXAMPLE 2

The procedure of Example 1 was duplicated entirely except that in step (b) only half as much sulfuric acid was utilized for the gelatinization. A somewhat similar porous xerogel was obtained.

EXAMPLE 3

(a) To 243 parts formalin (37 formaldehyde) was added 56 parts hexamethylenetetramine and then 126 parts melamine. The molar ratio of formaldehyde to melamine corresponds to 3:1 and the mixture contains .4 mol of hexamethylenetetramine for 1 mol of melamine. A clear solution was obtained by heating the mixture to 65° C. and the reaction was continued by maintaining the mixture at this temperature until a slight turbidity appeared (about five hours).

(b) For each 100 grams of the reaction products there were added 50 cc. of 2 N-sulfuric acid solution. Gelation occurred after about eight to twelve minutes and the gels were maintained at 65° C. for thirty minutes.

(c) The gel was removed from its container and dried and polymerized in the same manner as in the corresponding step (c) in Example 1. An excellent porous xerogel was obtained.

The procedure of Example 3 was repeated except that the molar ratio of formaldehyde to melamine was changed to 4:1 and 5:1 and in each instance the final products were excellent porous xerogels.

In these processes involving the use of hexamethylenetetramine, this compound apparently enters the reaction and becomes an integral part of the melamine-formaldehyde condensation product, modifying to a considerable extent the properties of such product and especially increasing the mechanical strength of the finished colloid.

It will be obvious that other acids may be used in place of the sulfuric acid to obtain the desired gelatinization. The times and temperatures utilized in the several steps may also be varied to some extent, higher temperatures giving more rapid reaction and hence requiring less time. In general it is desired to operate at minimum temperatures since the more rapid reaction obtained at higher temperatures may sometimes cause slight difficulties in control of the various steps.

The porous xerogels of the present invention are susceptible of many and varied uses. In view of their relative insolubility and porous characteristics, they are much similar to the well-known silica gels and may be used to replace the latter, with the additional advantage that these materials are organic in nature and, for certain purposes, this is a valuable asset. My gels may be used as carriers for explosives and the like.

The porous xerogels of the present invention may be mixed with other materials such as activated carbon by physical admixture of my ground xerogel with the carbon or the latter may be introduced into the solution of the reaction product prior to gelling thereof and in this way a more intimate admixture may be obtained. The resultant product, as with the pure xerogel may be used in the form of cast blocks, granules or finely ground powder in accordance with the desired physical nature of the final product.

My porous xerogels may also be mixed with other polymerizable substances such as butadiene, vinyl derivatives, acrylonitrile derivatives, etc. and such substances may be polymerized in the interstices of the porous xerogel to give plastic compositions.

Some of the conditions for carrying on the operations may be somewhat critical since it is undesirable to produce masses which are not coherent and which appear to be powdery materials loosely cemented together and easily disintegrated. However, it should be noted that best products are obtained when there is formed a hydrophilic sol which can undergo gelation without separation of dispersing medium from the dispersed medium and which gel may be polymerized to the insoluble form while retaining its physical porous structure without collapse in the drying step. Other suitable changes and variations may be made without departing from the spirit and scope of the invention as defined in the appended claims.

I claim:

1. The process of forming a porous xerogel which comprises heating to about 65° C. a mildly alkaline mixture containing formaldehyde and melamine in a molar ratio of about 3:1 to about 5:1 until the mixture begins to show slight signs of turbidity, adding an aqueous acid solution until the mixture is definitely acid, continuing heating at about 65° C. for about 30 minutes, drying the gelled mass formed at room temperatures and completing the drying at gradually raised temperatures to about 100° C. until there is formed a white, porous xerogel, the voids of which form about 20% to about 30% of the total volume.

2. The process of forming a porous xerogel which comprises heating to about 65° C. a mildly alkaline mixture containing formaldehyde, melamine and hexamethylenetetramine in which the molar ratio of formaldehyde to melamine corresponds to about 3:1 to about 5:1 and the hexamethylenetetramine corresponds to about .4 mol for 1 mol of melamine, the heating being continued until the mixture begins to show slight signs of turbidity, adding an aqueous acid solution until the mixture is definitely acid, continuing heating at about 65° C. for 30 minutes, drying the gelled mass formed at room temperatures and completing the drying at gradually raised temperatures to about 100° C. until there is formed a white, porous xerogel, the voids of which form about 20% to 30% of the total volume.

3. The process of preparing a porous xerogel which comprises reacting melamine with formaldehyde in the presence of a relatively minor amount of hexamethylenetetramine to form a hydrophilic sol, diluting the sol with an aqueous acid solution to gelatinize the contained emulsoid, prepolymerizing the gel to a state of rigidity without substantial alteration of its volume, drying to remove contained dispersion medium without collapse of the porous structure of the dried gel, polymerizing and hardening the gel to form an insoluble porous xerogel.

KURT E. RIPPER.